(12) United States Patent
Alexander (10) Patent No.: US 7,866,861 B2
(45) Date of Patent: Jan. 11, 2011

(54) LAMINATED DEVICE FOR SELECTIVE PRESENTATIONS FROM THE EXTERIOR OF A MOBILE VEHICLE AND METHOD OF USE THEREOF

(76) Inventor: Jerry Dewanye Alexander, 1497 Estill St., Memphis, TN (US) 38109

(*) Notice: Subject to any disclaimer, the term of this patent is extended or adjusted under 35 U.S.C. 154(b) by 268 days.

(21) Appl. No.: 11/488,119

(22) Filed: Jul. 16, 2006

(65) Prior Publication Data
US 2007/0019424 A1   Jan. 25, 2007

(51) Int. Cl.
*F21V 33/00* (2006.01)
(52) U.S. Cl. .................................... 362/503
(58) Field of Classification Search ............ 362/503, 362/504
See application file for complete search history.

(56) References Cited

U.S. PATENT DOCUMENTS

| | | | |
|---|---|---|---|
| 4,868,542 A * | 9/1989 | Thompson | 340/468 |
| 5,339,550 A * | 8/1994 | Hoffman | 40/544 |
| 5,497,572 A * | 3/1996 | Hoffman | 40/544 |
| 5,764,141 A * | 6/1998 | Chang | 340/472 |
| 5,905,434 A * | 5/1999 | Steffan et al. | 340/464 |
| 6,124,783 A * | 9/2000 | Alexander | 340/426.12 |
| 7,048,422 B1 * | 5/2006 | Solomon | 362/503 |
| 2005/0088850 A1 * | 4/2005 | Miller | 362/503 |
| 2005/0190570 A1 * | 9/2005 | Roessler | 362/503 |

* cited by examiner

Primary Examiner—Laura Tso (57) ABSTRACT

A mobile vehicle information device that is laminated to the glass surface of or laminated between glass pieces of a windshield or window is provided. The information device has illuminating and radiating properties that are operated by power consoles to permit selected illumination of the information for viewing external to the vehicle.

9 Claims, 9 Drawing Sheets figure 1 figure 2 figure 3 figure 4 figure 5 figure 6 figure 7 figure 8 figure 9

LAMINATED DEVICE FOR SELECTIVE PRESENTATIONS FROM THE EXTERIOR OF A MOBILE VEHICLE AND METHOD OF USE THEREOF

FIELD OF THE INVENTION

This invention pertains to a laminated device that illuminates or radiates light that is visible to the human eye when in operation and is provided in a configuration that can be used to advertise a trademark name, logos, or other words or designs, on the exterior of an mobile vehicle, such as on a window or a windshield.

BACKGROUND OF THE INVENTION

People use mobile vehicles to advertise the name of their business, such as on the glass surfaces of their vehicles, using a stick on label, stick on letters at the top of vehicle glass, or other like means. Using this new visible device, one can laminate LED (light emitting diodes), OLED (organic light emitting diodes), EL (electroluminescent films), or other like light emitting materials, onto mobile vehicle glass or other transparent vehicle portions to advertise a trademark name, logo, or other words or designs that will flash or illuminate on the exterior of mobile glass or transparent vehicle portions.

SUMMARY OF THE INVENTION

This Visible Device is made of laminated material LED, OLED, EL or other like light emitting materials, that can be used to advertise a trademark name, logo, or other like words and designs laminated onto mobile vehicle glass or other transparent vehicle portions, when activated by a supplied power control. For example, rather than have a lamp indicating with small green or red lights the availability of a taxi cab, the instant invention can permit cabs to display the word "VACANT" flashing on the exterior of mobile glass (such as the windshield), to let potential customers know the cab is now available for hire. The invention is not so limited to taxicabs, however, as any member of the public, such as people that drive around with logos using stick on tape or paint design on their mobile vehicles, such as across the top of mobile vehicles may use this device people to illuminate any words or designs selectively by activating a connected-power control.

DESCRIPTION OF THE DRAWINGS AND PREFERRED EMBODIMENTS

Figure 1:
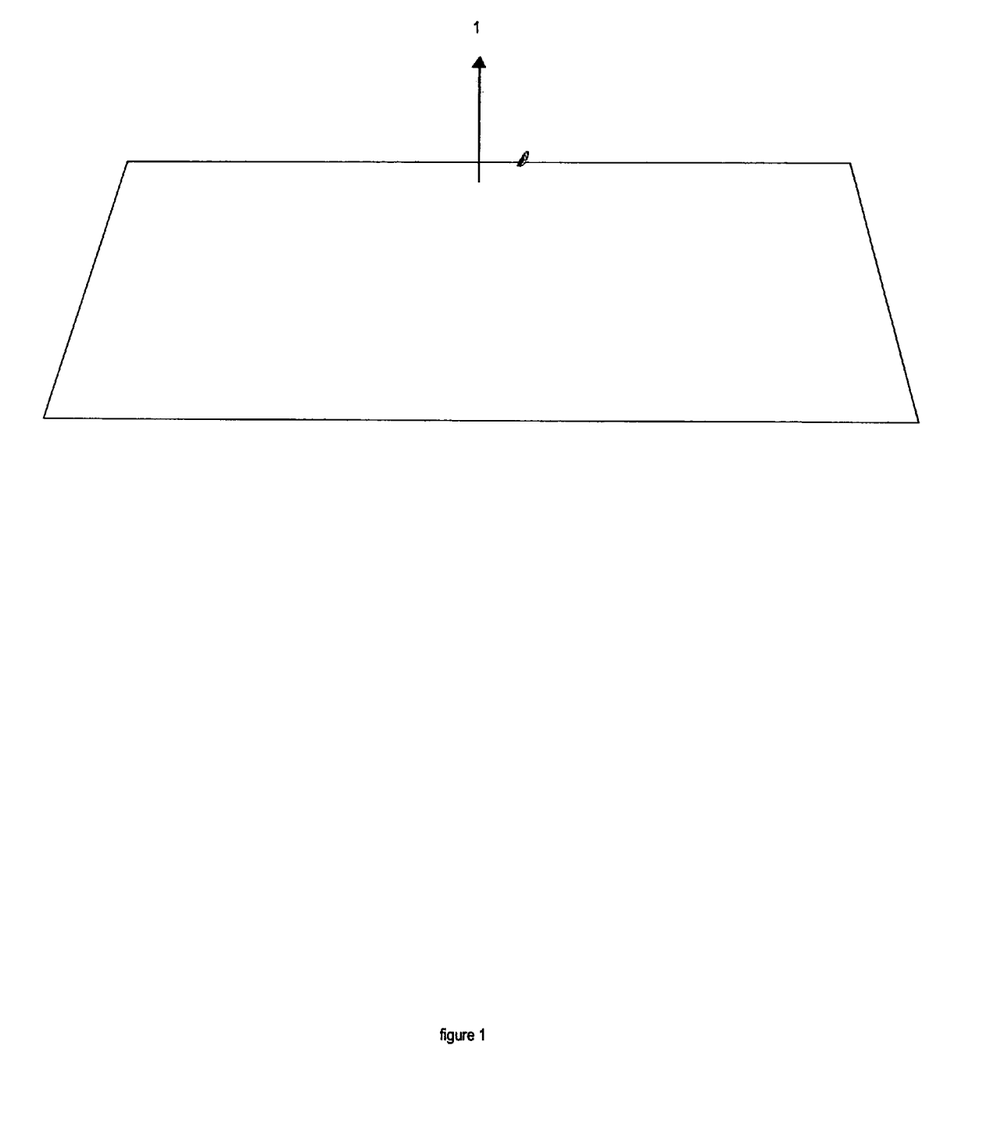
FIG. 1 shows a side view of an uncovered vehicle glass portion.

FIG. 1 displays a whole mobile windshield glass 1 made out of two pieces of glass with privacy film laminated between.

Figure 2:
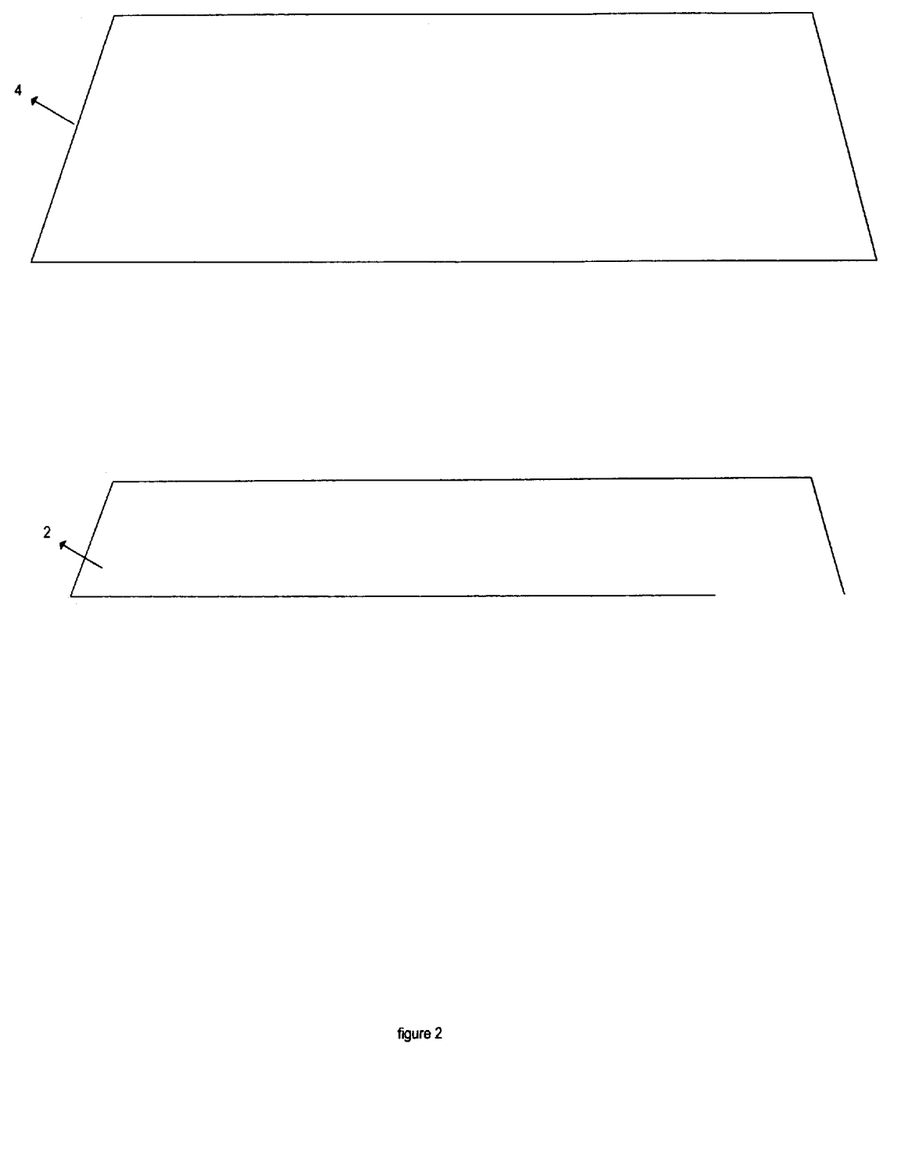
FIG. 2 shows side views of separate film and lamination material prior to lamination to a vehicle glass portion.

FIG. 2 shows privacy film 4 along with lamination material, including therein a light emitting material, such as LED, OLED, EL (and the like) to be placed between mobile glass (such as provided in FIG. 1).

Figure 3:
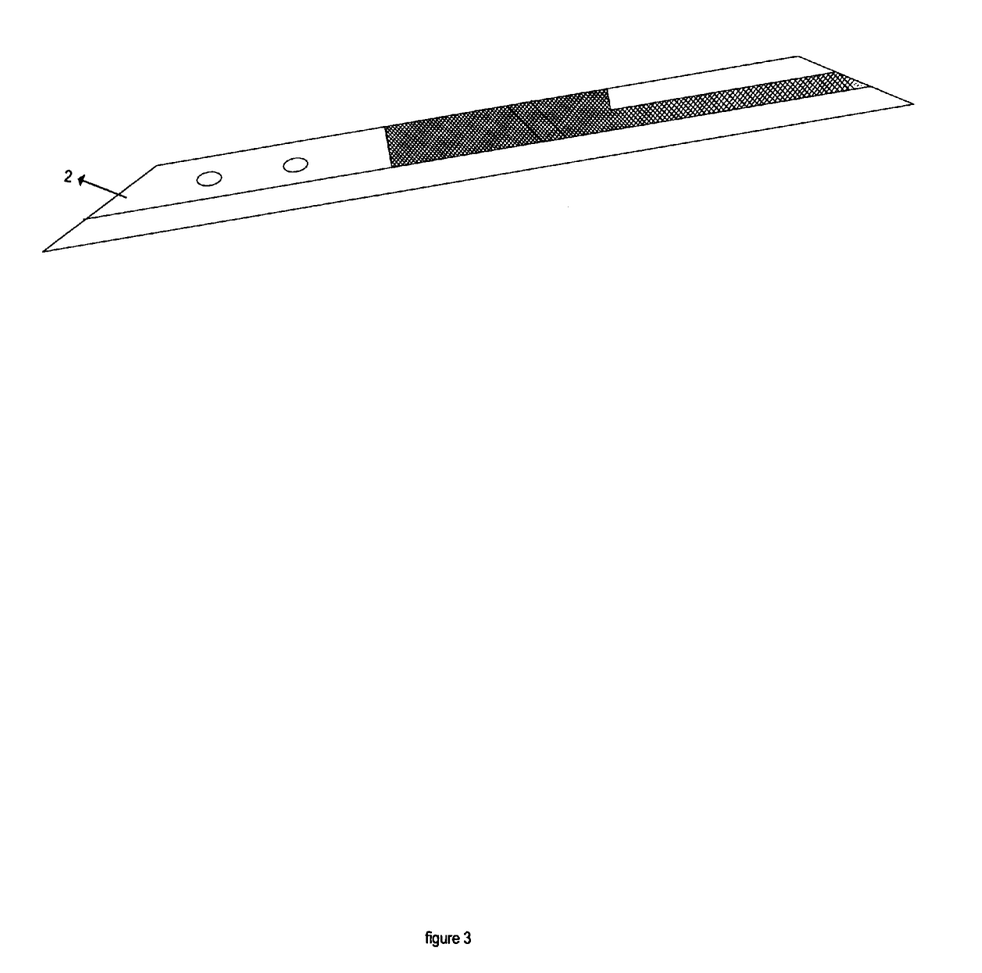
FIG. 3 shows a side view of a lamination material alone prior to lamination to a vehicle glass portion.

FIG. 3 shows lamination material (as described in FIG. 2) 2 to be used to laminate to the glass portion of a mobile vehicle (such as a windshield, as in FIG. 6, or a window, as in FIG. 7) to display letters, words, logos, or other information exterior to the vehicle.

Figure 4:
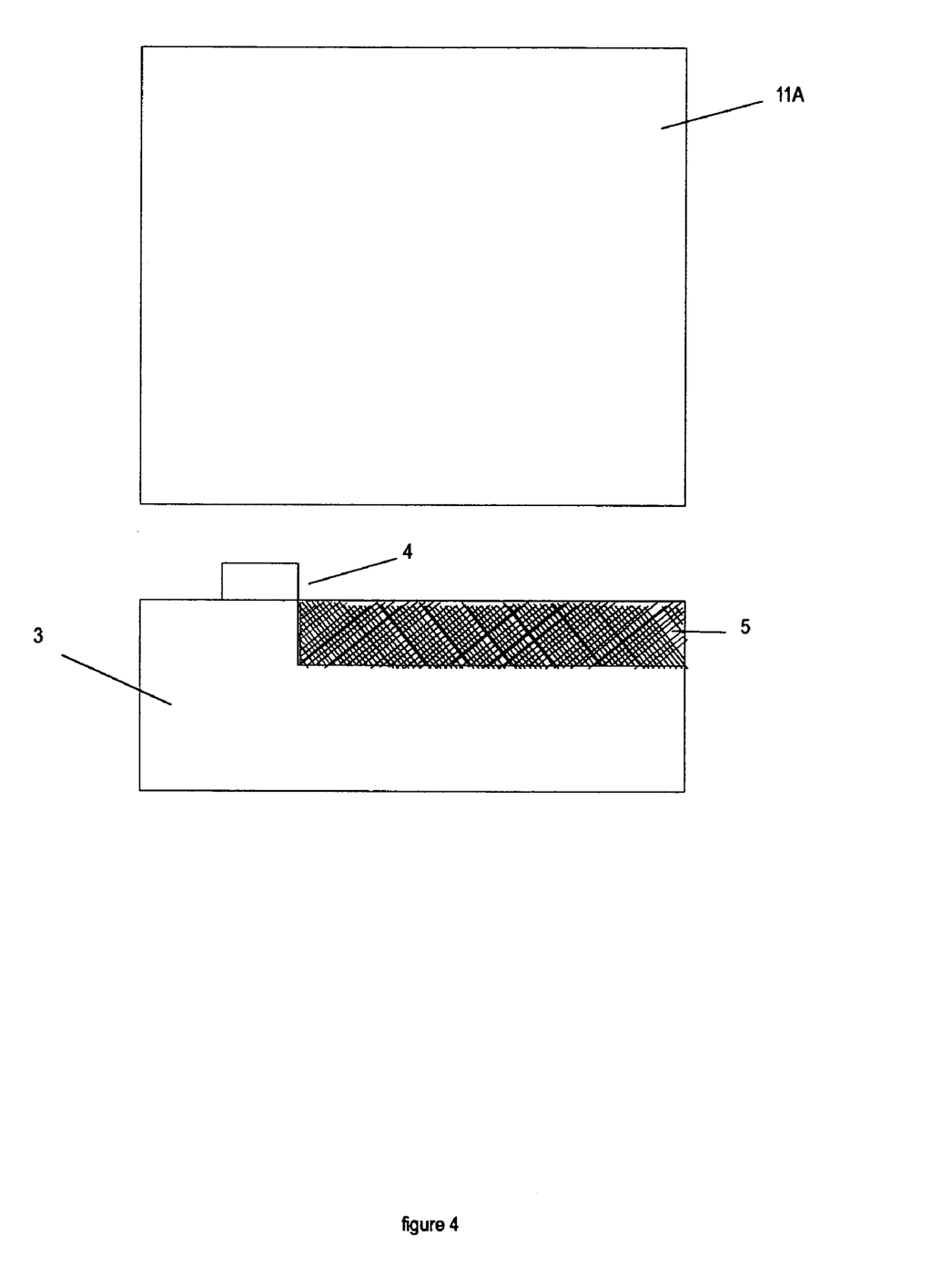
FIG. 4 shows side views of a vehicle glass portion (such as a vehicle windshield) and a laminated material having other components.

FIG. 4 shows a side glass portion of a mobile vehicle 11A and lamination material including LED, OLED, EL or other light emitting materials 3 with a connector end 4 and a magnetic field 5 to be laminated onto the side glass portion 11A for the purpose of permitting the advertisement of food (or other commercial products or services) through the illumination of the light emitting materials in a selected configuration.

Figure 5:
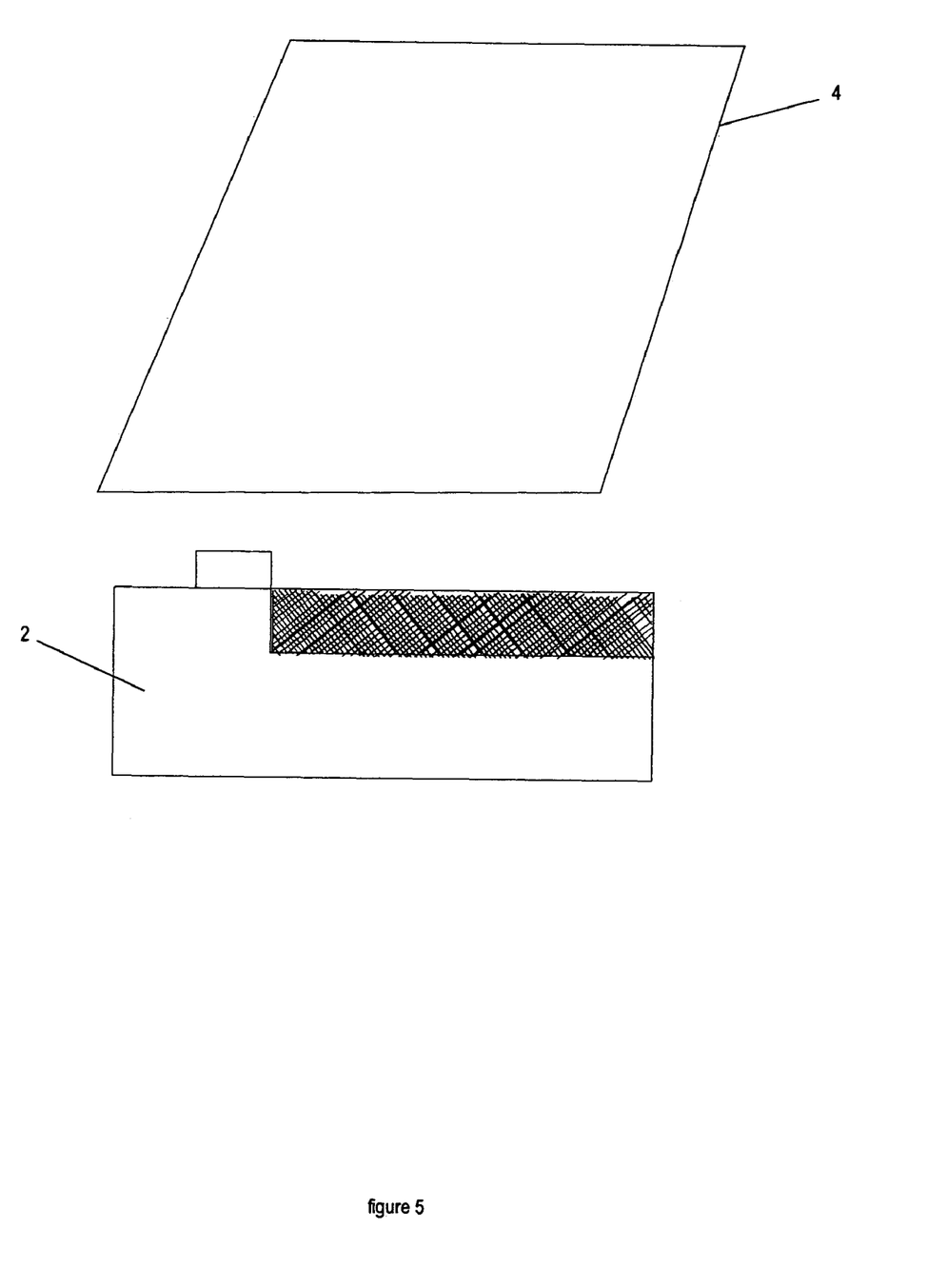
FIG. 5 shows a side view of what is intended to be a vehicle glass portion other than a windshield) and laminated material as in FIG. 4, above.

FIG. 5 is basically the same as depicted in FIG. 4, except the lamination material is applied to a different transparent glass material 4 for mobile vehicles with lamination material including LED, OLED, EL or other light emitting materials.

Figure 6:
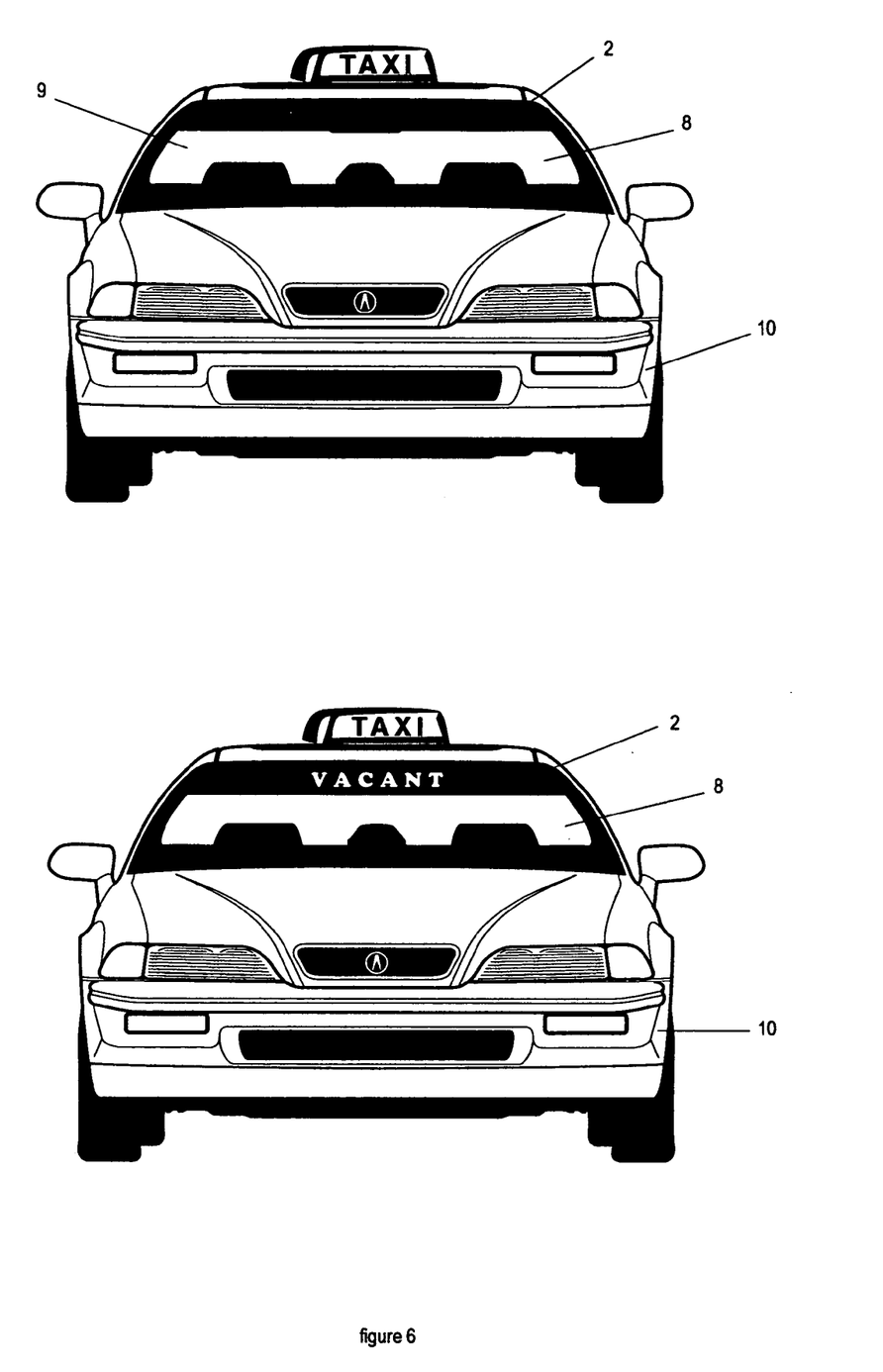
FIG. 6 provides comparative front views of a taxicab incorporating the inventive device with one activated and the other not activated.

FIG. 6 shows the incorporation of the lamination material 2A (as described above) present between windshield glass panels and not activated by a driver 8 or a passenger 9 in a typical for-hire mobile vehicle 10 (here a taxicab). The second picture displays the activated (illuminated) lamination material displaying and flashing the word VACANT.

Figure 7:
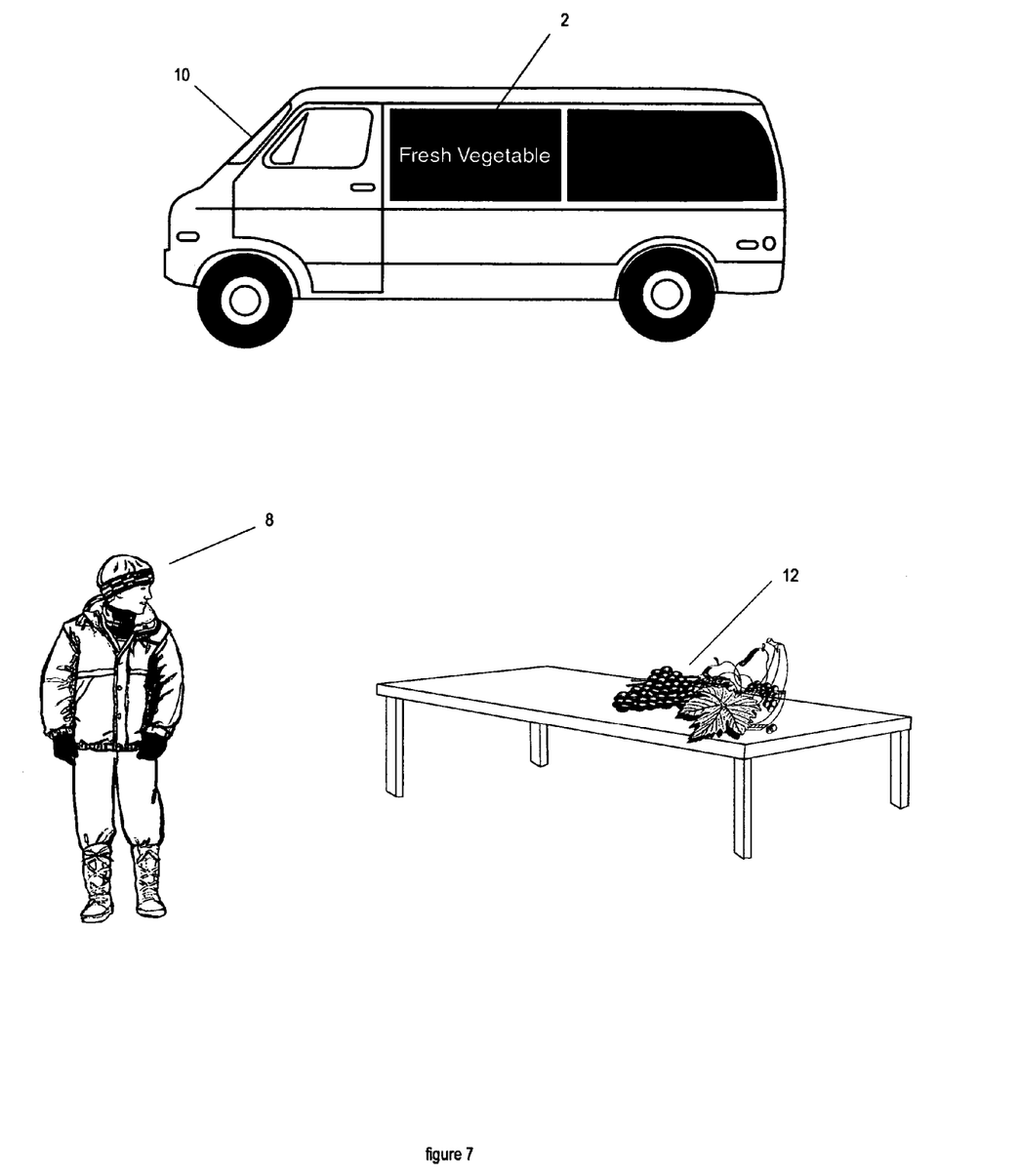
FIG. 7 shows a side view of a vehicle incorporating the inventive device on a side window to indicate a message to a potential customer.

FIG. 7 displays a vehicle (in this case a van) including an illuminated lamination material laminated on a side glass portion of the mobile vehicle 10 (here, a side window) with the lamination material 2 (as well as a connector end 4 and a magnetic field 5 laminate, as depicted in FIG. 4, above). Thus, the driver 8 can use the mobile vehicle to display/flash the visible device 2 to advertise to the public his/her fresh vegetables 12 (as one non-limiting example).

Figure 8:
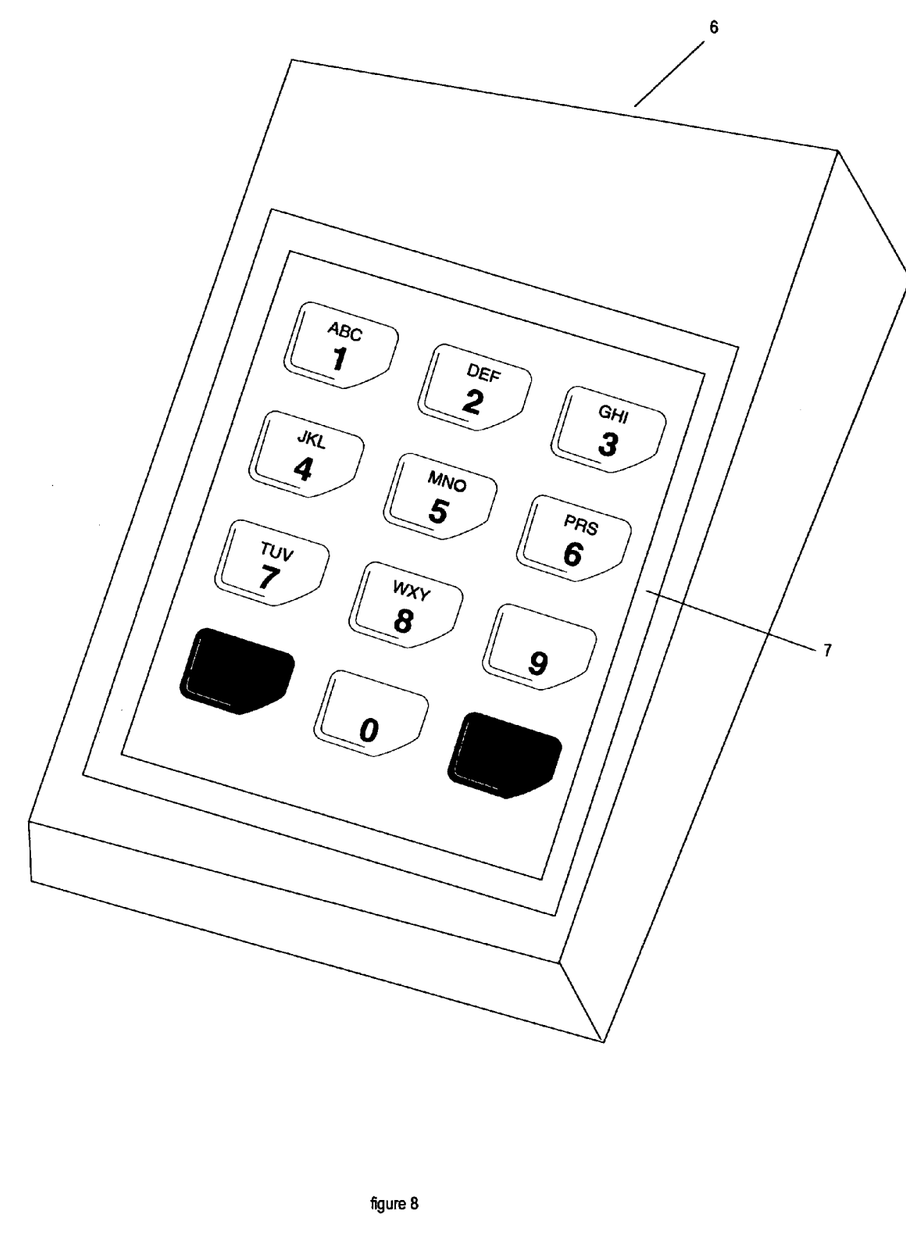
FIG. 8 provides an aerial view of a controller housing with keyboard for use with the inventive device.

FIG. 8 thus shows an acceptable housing 6 with a built in keyboard 7 to type letters or numbers (or other figures) to display on the lamination material applied to the glass portion of a mobile vehicle (as in FIG. 6 or 7).

Figure 9:
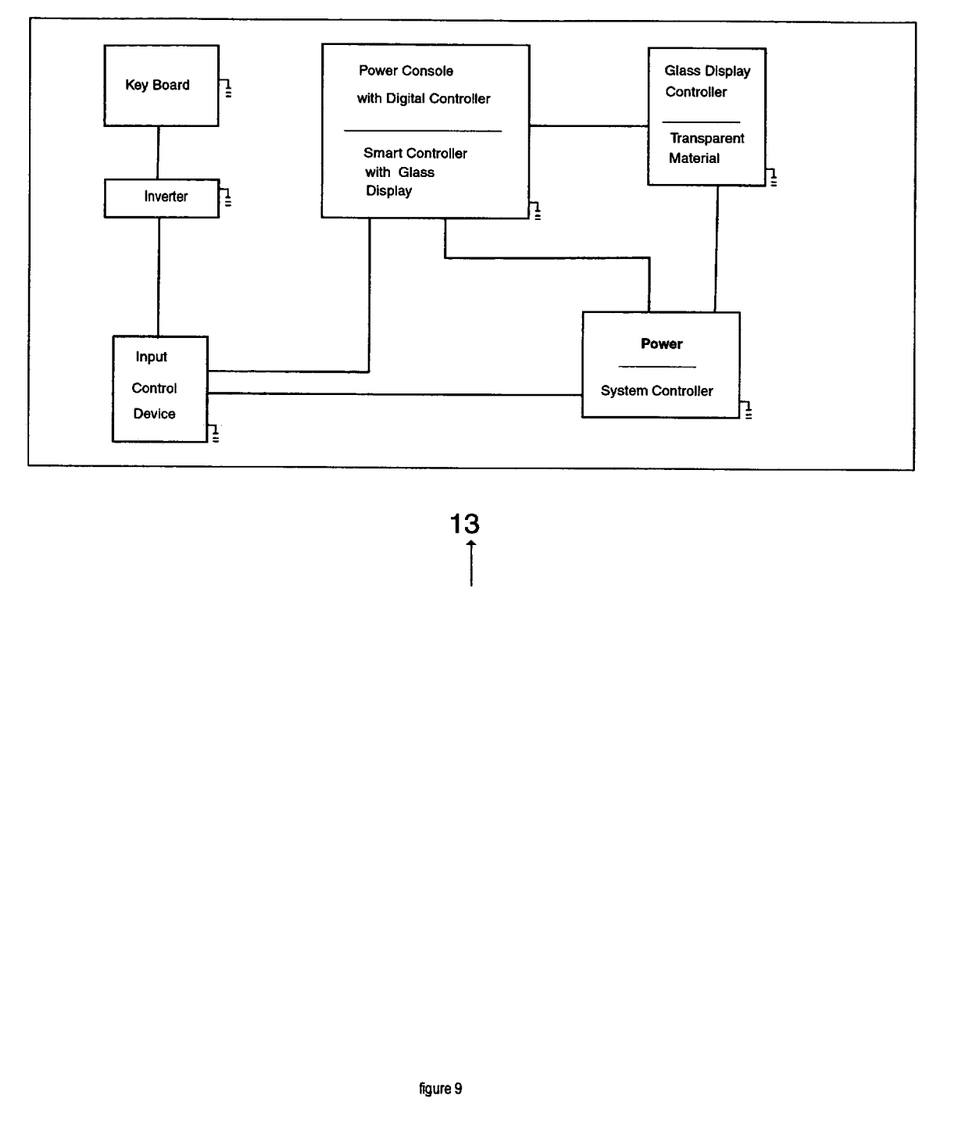
FIG. 9 depicts a system configuration for the entire inventive device.

FIG. 9 shows the overall configuration of one preferred embodiment of the overall information providing device of the invention including a power console 13, that itself includes a connecting component including itself an input control, and further including an inverter, a keyboard, a glass controller, the glass portion of the subject vehicle, smart controller and system controller to operate the lamination material (such as 2 in FIGS. 6 and/or 7).

The invention claimed is:

1. A device for the display of information from the glass portion or other transparent portion of a vehicle, said device including a power console, a keyboard, and a laminate material applied to a vehicle portion selected from a glass portion and a film applied to a glass portion, wherein said laminate material includes a light emitting material therein arranged to provide a display of letters, designs, and any combination thereof, upon activation of said power console, wherein said display of letters, designs, and any combination thereof are arranged through the control of said keyboard, and wherein said laminate material may be placed on any location on said vehicle that includes a glass portion thereof.

2. The device of claim 1 wherein said light emitting material is selected from the group consisting of light emitting diodes, organic light emitting diodes, and electroluminescent films.

3. The device of claim 1 wherein said laminate material is applied to the glass portion directly.

4. The device of claim 1 wherein said laminate material is applied to a film applied to the glass portion.

5. The device of claim 1 wherein said glass portion is a windshield.

6. The device of claim 1 wherein said glass portion is a window.

7. The device of claim 4 wherein said glass portion is a windshield.

8. The device of claim 3 wherein said glass portion is a window.

9. A method of providing information from a mobile vehicle comprising providing a mobile vehicle, incorporating the device of claim 1 therein by applying said laminating material including light emitting materials therein to a glass portion of said mobile vehicle, configuring said device to depict letters, words, logos, or designs, and any combination thereof upon activation and subsequent illumination of said light emitting materials, and activating said device.

* * * * *